United States Patent [19]

Candor

[11] 4,283,862
[45] * Aug. 18, 1981

[54] ELECTROSTATIC METHOD AND APPARATUS FOR TREATING MATERIAL

[76] Inventor: James T. Candor, 5440 Cynthia La., Dayton, Ohio 45429

[*] Notice: The portion of the term of this patent subsequent to Nov. 19, 1991, has been disclaimed.

[21] Appl. No.: 124,224

[22] Filed: Feb. 25, 1980

Related U.S. Application Data

[60] Division of Ser. No. 50,807, Jun. 21, 1979, Pat. No. 4,208,807, which is a continuation-in-part of Ser. No. 925,378, Jul. 17, 1978, abandoned, which is a division of Ser. No. 863,910, Dec. 23, 1977, Pat. No. 4,111,773, which is a continuation-in-part of Ser. No. 732,646, Oct. 15, 1976, Pat. No. 4,081,342, which is a continuation-in-part of Ser. No. 695,068, Jun. 11, 1976, Pat. No. 4,033,841, which is a continuation-in-part of Ser. No. 569,815, Apr. 21, 1975, Pat. No. 3,966,575, which is a continuation-in-part of Ser. No. 499,178, Aug. 21, 1974, Pat. No. 3,893,898, which is a continuation-in-part of Ser. No. 383,255, Jul. 27, 1973, Pat. No. 3,849,275, which is a division of Ser. No. 263,605, Jun. 16, 1972, Pat. No. 3,795,605, which is a continuation-in-part of Ser. No. 53,402, Jul. 9, 1970, abandoned, said Ser. No. 263,605, which is a continuation-in-part of Ser. No. 25,938, Apr. 6, 1970, Pat. No. 3,687,834, which is a continuation-in-part of Ser. No. 864,851, Oct. 8, 1969, abandoned, which is a continuation-in-part of Ser. No. 811,421, Mar. 28, 1969, abandoned.

[51] Int. Cl.³ .................. F26B 3/34; B01D 57/02; C25B 7/00

[52] U.S. Cl. .................. 34/1; 204/180 R

[58] Field of Search .............. 34/1; 204/180 R, 300 R

[56] References Cited

U.S. PATENT DOCUMENTS

| 3,543,408 | 12/1970 | Candor et al. | 34/1 |
|---|---|---|---|
| 3,633,282 | 1/1972 | Candor et al. | 34/1 |
| 3,952,421 | 4/1976 | Wilson et al. | 34/1 |
| 3,965,581 | 6/1976 | Candor | 34/1 |
| 3,999,302 | 12/1976 | Candor | 34/1 |
| 4,033,841 | 7/1977 | Candor | 204/180 R |
| 4,081,342 | 3/1978 | Candor | 204/180 R |
| 4,208,807 | 6/1980 | Candor | 34/1 |

FOREIGN PATENT DOCUMENTS 749202  5/1956  United Kingdom .

Primary Examiner—John J. Camby
Attorney, Agent, or Firm—Candor, Candor & Tassone

[57] ABSTRACT

A method and/or apparatus for drying material by disposing the material against a heated surface that has a charged electrode arrangement disposed adjacent the surface and cooperating therewith to define a plurality of alternately arranged non-uniform electrostatic fields extending between the electrode arrangement and the surface with each non-uniform field having the higher intensity portion thereof substantially oppositely located relative to the higher intensity portion of an adjacent non-uniform field so that the fields can at least partially extend through the material when the material is disposed against the surface and between the surface and the electrode arrangement.

27 Claims, 7 Drawing Figures

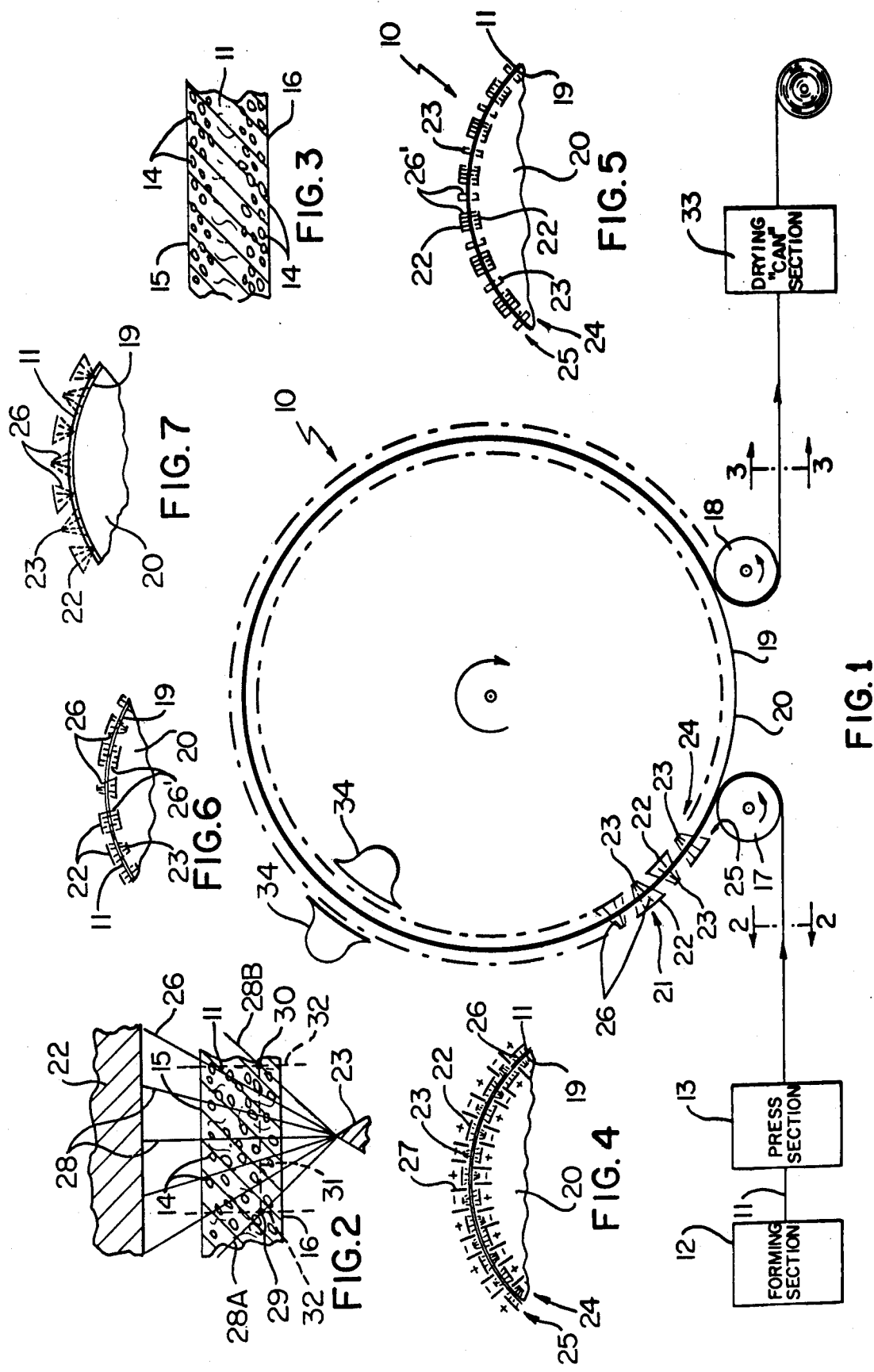

ELECTROSTATIC METHOD AND APPARATUS FOR TREATING MATERIAL

This application is a divisional patent application of its copending parent patent application, Ser. No. 050,807, filed June 21, 1979, now U.S. Pat. No. 4,208,807, which, in turn, is a Continuation-in-Part application of its copending parent application, Ser. No. 925,378, filed July 17, 1978, now abandoned and which, in turn, is a divisional patent application of its copending parent patent application, Ser. No. 863,910, filed Dec. 23, 1977, now U.S. Pat. No. 4,111,773, which, in turn, is a Continuation-in-Part application of its copending parent patent application, Ser. No. 732,646, filed Oct. 15, 1976, now U.S. Pat. No. 4,081,342, which, in turn, is a Continuation-in-Part application of its copending parent application, Ser. No. 695,068, filed June 11, 1976, now U.S. Pat. No. 4,033,841, which, in turn, is a Continuation-in-Part application of its copending parent application, Ser. No. 569,815, filed Apr. 21, 1975, now U.S. Pat. No. 3,966,575, which, in turn, is a Continuation-in-Part application of its copending parent application, Ser. No. 499,178, filed Aug. 21, 1974, now U.S. Pat. No. 3,893,898, which, in turn, is a Continuation-in-Part application of its copending parent patent application, Ser. No. 383,255, filed July 27, 1973, now U.S. Pat. No. 3,849,275, which, in turn, is a divisional application of its copending parent patent application, Ser. No. 263,605, filed June 16, 1972, now U.S. Pat. No. 3,795,605, which, in turn, is a Continuation-in-Part application of its copending parent patent application, Ser. No. 53,402 filed July 9, 1970, abandoned in favor of said application Ser. No. 263,605 and which, in turn, is a Continuation-in-Part patent application of its copending parent application, Ser. No. 25,938, now U.S. Pat. No. 3,687,834, filed Apr. 6, 1970, which, in turn, is a Continuation-in-Part of its copending parent patent application, Ser. No. 864,851, filed Oct. 8, 1969, now abandoned, which, in turn, is a Continuation-in-Part patent application of its copending parent patent application, Ser. No. 811,421, filed Mar. 28, 1969, and now abandoned; that aforementioned Ser. No. 569,815, in part also discloses and claims subject matter disclosed in the earlier filed pending application, Ser. No. 548,666, filed Feb. 10, 1975, now U.S. Pat. No. 3,965,531, which, in turn, is a Continuation-in-Part application of its copending parent application, Ser. No. 469,820, filed May 14, 1974, now U.S. Pat. No. 3,931,682, as well as a Continuation-in-Part application of copending Ser. No. 405,023, filed Oct. 10, 1973, now U.S. Pat. No. 4,060,449, and Ser. No. 499,178, filed Aug. 21, 1974, now U.S. Pat. No. 3,893,898.

This invention relates to an improved electrostatic method and apparatus for treating material, such as for electrostatically removing retained liquid from web-like liquid bearing material of the liquid absorbing type.

It is well known from applicant's aforementioned U.S. Pat. No. 3,966,575 and its chain of related patent applications and issued patents that it is believed that liquid in liquid bearing material of the liquid absorbing type can be moved relative to that material when the liquid bearing material is passed through a plurality of non-uniform electrostatic fields with each field having the higher intensity portion thereof substantially oppositely located relative to the higher intensity portion of an adjacent non-uniform field so that the fields at least partially extend through the material to act on at least part of the retained liquid thereof to move at least part of the retained liquid relative to the material.

It is a feature of the aforementioned parent U.S. Pat. No. 4,033,841, to illustrate, describe and claim the above liquid moving feature in combination with a conventional method and apparatus of removing retained liquid from web-like liquid bearing material of the liquid absorbing type as the material is being substantially continuously moved therein to improve upon such conventional method and apparatus.

In particular, it is believed that the alternately arranged non-uniform electrostatic fields of this invention will move the moisture particles in the liquid bearing material in such a manner that the liquid particles will be arranged closely adjacent the outer surfaces of the liquid bearing material so that the subsequent engagement of those outer surfaces with the conventional liquid vaporizing equipment will cause a more rapid removal of such liquid particles as the same are concentrated adjacent the outer surfaces thereof rather than dispersed throughout the same as in the conventional methods and apparatus.

Such feature of concentrating the liquid particles adjacent the outer surfaces of the wet web of material is known as the "bonus effect" in the web drying art.

For example, see the December 1974 "Journal of the Technical Association of the Pump and Paper Industry" (TAPPI) volume 5, No. 12, at page 134 wherein an article entitled "An Updated Review of Dielectric Heating in the Paper, Pulp and Board Industry" By T. L. Wilson indicates that the dielectric heating of the liquid particles in a wet web of material causes the center particles to rapidly explode into steam and entrain the other liquid particles to move the same closer to the outer surfaces of the wet web of material so that such moved moisture particles will be more readily subsequently removed by conventional vaporizing equipment and thereby the dielectric heating operation produces the "bonus effect" in a manner similar to the feature of this invention as theorized above.

Accordingly, one embodiment of the invention in the aforementioned parent U.S. Pat. No. 4,033,841, provides means for creating a plurality of non-uniform electrostatic fields with each field having the higher intensity portion thereof substantially oppositely located relative to the higher intensity portion of an adjacent non-uniform field and means for passing a continuously moving web-like material through the fields so that the fields at least partially extend through the material to act on at least part of the retained liquid thereof to move at least part of the retained liquid relative to the material, such embodiment of that invention being utilized in a conventional method or apparatus that is utilized for removing retained liquid from web-like liquid bearing material of the liquid absorbing type as the material is being substantially continuously moved.

However, it is a feature of the aforementioned parent application, Ser. No. 732,646, to modify such embodiment to repetitively change the electrostatic field pattern thereof to act not only on wet fibrous material being passed through such changing electrostatic field pattern, but on any desired material, such as gas, liquid, etc., passed through such changing electrostatic fields.

In particular, one embodiment of that invention provides a method and apparatus for treating material that is disposed in an electrostatic field pattern to be acted upon by the electrostatic field pattern and having means for repetitively changing the electrostatic field pattern from a substantially uniform electrostatic field pattern to a substantially non-uniform electrostatic field pattern and then back to the substantially uniform electrostatic field pattern while the field pattern is acting on the material disposed therein, the material being a wet web-like fibrous material, a fluid, etc.

It is known from the U.S. patent to Candor et al., U.S. Pat. No. 3,641,680, that it has been suggested that the combination of vibrating action and electrostatic field action on the moisture bearing material will tend to remove such moisture from the moisture bearing material because it is believed that the vibrating action will tend to reduce the particle size of the moisture in the moisture bearing material to tend to reduce the capillary holding action of the material on the moisture therein while the electrostatic field action will tend to sweep such reduced sized moisture particles from the moisture bearing material by an electro-osmotic action. Also, see the U.S. Patent to Candor, U.S. Pat. No. 3,931,682.

It is also known that dielectric heating is utilized to remove moisture from moisture bearing material by passing the moisture bearing material through a high-intensity, high-frequency electric field such as is produced by a radio frequency generator.

In the case of dielectric heating wet fibrous webs, such as paper or pulp, it is known from the aformentioned TAPPi article, that the dielectric heating of the web of material causes the moisture particles in the center portion of the web of material to rapidly turn to steam which explodes outwardly toward the opposed sides of the web of material and carries with it other particles of liquid water that are subsequently caught adjacent the opposed surfaces of the web of material by the more dense and hard surface layers thereof which are sufficiently porous to permit the passage of vapor, but not the moved particles of moisture.

It is believed, according to the teachings of the invention of the aforementioned parent U.S. Pat. No. 3,965,581, that if the moisture particles in such web of material are reduced in size by a sonic or ultrasonic vibrating action, the dielectric heating process will be improved as the reduced size particles of moisture being swept along by the exploding central portion of steam in the web can more readily be pushed out through the denser outer layers of the web of material. Also, the dielectric heating action on the reduced sized particles more rapidly heats up the same. Also, it is believed, according to the teachings of that invention, that if an electrostatic field action is also acting on the dielectric heating material, such electrostatic field action will assist the steam action in moving the moisture particles toward the outer layers of the web of material through the force of the electrostatic field action thereon and also will tend to remove the moisture from the outer surfaces or layers of the material for the reasons previously set forth.

Accordingly, the purpose of the aforementioned Continuation-in-Part application, Ser. No. 863,910, is to illustrate, describe and claim a believed to be further advantage of the combination of vibratory and dielectric heating action and/or vibratory and electrostatic action as will be apparent hereinafter by incorporating vibratory action in the various embodiments of the aforementioned parent application, Ser. No. 732,646.

Thus, it is a feature of that invention to improve upon the dielectric heating action of a high frequency electric field being imposed on a strip of liquid bearing fibrous material or the like.

It is believed that this feature can be accomplished by sonically or ultrasonically vibrating at least the outer layers of the strip of material at the same time the particles of retained liquid in the strip of material are being dielectrically heated.

In particular, it is believed that when a strip of liquid bearing fibrous material is being dielectrically heated, the retained liquid particles in the center layer thereof are more rapidly heated and turned to steam than the liquid particles in the outer opposed layers thereof because the liquid particles in the outer layers dissipate their heat to the surrounding atmosphere at a rate that increases progressively the closer the liquid particles are to the outer opposed surfaces of the strip of material.

It is believed, in contrast, that the liquid particles in the outer opposed layers of the strip of material are vibrated at a greater rate than the liquid particles in the center layer thereof when sonic or ultrasonic energy is imposed against the outer opposed surfaces of the strip of material because the vibratory waves are progressively dissipated as they progressively penetrate into the strip of material.

However, it is believed according to the teachings of the invention of aforementioned patent application, Ser. No. 863,910, that by combining the dielectric heating action with a vibratory action, the vibratory action will increase the beneficial results of the dielectric heating action by:

(1) increasing the rate of the dielectric heating of the liquid particles in the outer layers of the strip of material through the mechanical high frequency movement of those liquid particles through the field lines of force of the high frequency electric field being imposed on the strip of material.

(2) increasing the flowing rate of steam entrained liquid particles out through the outer layers by reducing the resistance of the fibers in the outer layers to such flow, the above to effects (1) and (2) being in addition to the beneficial effect of the heating of the liquid particles through the friction created between the vibrating liquid particles and the fibers of the material.

In particular, it is believed that the vibrating action causes the retained liquid particles to oscillate tens of thousands of times through field lines of force, at least immediately adjacent the outer opposed surfaces and with a progressively decreasing rate into the center layer of the strip of material, and if such field lines of force are angled relative to such oscillating movement, a partial oscillating rotation effect is created on the vibrating liquid particles and this oscillation coupled with the full oscillating rotation effect on the particles caused by the oscillating high frequency electric field is believed to multiply or otherwise increase the dielectric heating rate from the dielectric heating rate if the same high frequency field is utilized without the vibrating action. Such high frequency vibrating action is also believed to increase the rate of flow of the steam entrained liquid particles out of the strip of material and-/or to move the entrained liquid particles closer to the outer layers to increase the "bonus effect" of the dielectric heating operation previously mentioned in connection with the aforementioned TAPPI article.

It is also believed that if the high frequency electric field lines of force are angled through the strip of material from one side thereto to the other side thereof and other than parallel between the opposed sides and other than perpendicular thereto, the oscillating effect of vibrating the retained liquid particles through such field lines of force to increase the dielectric heating of such liquid particles will be enhanced.

Thus, it is another feature of the invention of the aforementioned patent application, Ser. No. 863,910, to provide a plurality of non-uniform high frequency electric fields for the dielectric heating action and for the purpose of providing angled field lines of force through the strip of material.

In this regard, it may be found that with such non-uniform electric fields, a dielectric heating action may be created through the high frequency vibrating action on the retained liquid particles through the angled field lines of force without having the electric field also oscillating or at least not oscillating at a high frequency rate, whereby the non-uniform fields can be static and thereby constant.

In any event, one embodiment of the invention of the aforementioned patent application, Ser. No. 863,910, provides a method and/or apparatus for dielectrically heating retained liquid in a strip of liquid bearing fibrous material of the liquid absorbing type by vibrating at least the outer opposed layers of the strip of material in an electric field arrangement whereby at least some of the retained particles of liquid in the outer layers are vibrated through the electrostatic field lines of force of the field arrangement to cause such liquid particles to be dielectrically heated by the vibrating action at a greater rate than the retained particles of liquid in the inner layers thereof.

Such electric field arrangement can comprise a high frequency electric field arrangement and/or comprise a non-uniform electrostatic field arrangement that has a plurality of non-uniform electrostatic fields with each field having the higher intensity portion thereof substantially oppositely located relative to the higher intensity portion of an adjacent field.

It is also believed that the same high frequency electric source can be utilized to operate both apparatus that respectively produces the dielectric heating action of this invention and the high frequency vibratory action of this invention so that a savings in total cost for such apparatus can be provided.

It is believed that at least some of the aforementioned features can be obtained by merely disposing an electrode arrangement adjacent an existing heated surface to augment the drying effect of the heated surface if the electrode arrangement cooperates with the heated surface to define a plurality of alternately arranged non-uniform electrostatic fields extending between the electrode arrangement and the surface with each non-uniform field having the higher intensity portion thereof substantially oppositely located relative to the higher intensity portion of an adjacent non-uniform field so that the fields can at least partially extend through a material to be dried when the material is disposed against the surface and between the surface and the electrode arrangement.

For example, such heated surface could be an existing drier drum known as a "can" or "yankee" in the paper making industry and the material to be dried can be the paper webs normally being dried by such heated drums. Of course, this invention is not to be limited to the paper industry as it is believed that the features of this invention can be utilized with almost any type of drying system.

Therefore, it is an object of this invention to provide an improved method and/or apparatus for drying material, this invention having one or more of the novel features of this invention as set forth above or hereinafter shown or described.

Other objects, uses and advantages of this invention are apparent from a reading of this description which proceeds with reference to the accompanying drawings forming a part thereof and wherein:

FIG. 1 is a schematic view illustrating the improved method and apparatus of this invention.

FIG. 2 is an enlarged, fragmentary, cross-sectional view taken on line 2—2 of FIG. 1 and has one of the non-uniform fields 26 of FIG. 1 superimposed thereon.

FIG. 3 is an enlarged, fragmentary, cross-sectional view taken on line 3—3 of FIG. 1.

FIG. 4 is a fragmentary view similar to FIG. 1 and illustrates another embodiment of the method and apparatus of this invention.

FIGS. 5 and 6 are respectively fragmentary views similar to FIG. 1 and illustrate other embodiments of the method and apparatus of this invention.

FIG. 7 is a view similar to FIGS. 4-6 and illustrate another embodiment of the method and apparatus of this invention.

While the various features of this invention are hereinafter described and illustrated as being particularly adapted to provide means for removing liquid from wet fibrous material, it is to be understood that the various features of this invention may be utilized singly or in any combination thereof to remove liquid from other types of material, as desired.

Therefore, this invention is not to be limited to only the embodiments illustrated in the drawings, because the drawings are merely utilized to illustrate one of the wide variety of uses of this invention.

Referring now to FIG. 1, the improved method and apparatus of this invention is generally indicated by the reference numeral 10 and comprises a conventional paper making apparatus wherein a wet fibrous sheet 11 is formed in a conventional web-forming section 12 commonly known as a wet forming section.

The wet fibrous web 11 emerges from the wet forming section 12 and is normally passed through a press section 13 which tends to mechanically squeeze as much moisture from the wet web 11 as possible without adversely crushing the same whereby the wet web 11 of material emerging from the press section 13 still retains a relatively large amount of liquid therein which must be subsequently removed.

For example, see FIG. 2 wherein the web of material 11 is schematically illustrated in cross-section as having a plurality of liquid particles 14 dispersed throughout the same between the top surface 15 and bottom surface 16 thereof.

Normally, the wet web of material 11 passing from the press section 13 is directed to a liquid vaporizing drying section 33 which can comprise a plurality of heated cylindrical drums or "cans" around part of the periphery of which the wet web of material 11 is directed to have the moisture particles 14 thereof evaporated through the heating thereof by such steam heated "cans". Also, such drying section 33 could comprise a hot air impingement drying section wherein heated air is impinged against the opposed surfaces 15 and 16 of the wet web of material 11 to tend to vaporize the moisture particles 14 therein through the heating thereof by the heated air.

In any event, it is believed, according to the teachings of this invention, that if the wet web of material 11, between the press section 13 and the drying section 33, is passed through a plurality of alternately arranged nonuniform electrostatic fields, such electrostatic field action will act on the moisture particles 14 in the wet web of material 11 to tend to move the same from the center area thereof to areas closely adjacent the outer surfaces 15 and 16 thereof as illustrated in FIG. 3 so that when the web of material 11 enters the drying section 33, the moisture particles 14 can more readily be evaporated from the web of material 11 whereby a "bonus effect" will be produced by the non-uniform electrostatic field action of this invention.

For example, the wet web of material 11 between the press section 13 and the conventional drying section 33 can be passed by guide rollers 17 and 18 against the outer peripheral portion 19 of a rotatable drum means 20 so that the web of material 11 will be carried by the drum 20 through an arcuate path as illustrated.

A plurality of pairs 21 of large 22 and small 23 electrodes are disposed in the arcuate arrangement illustrated in FIG. 1 so that an inner row 24 of alternating large and small electrodes 22 and 23 is disposed inside the non-conductive outer periphery 19 of the drum 20 laterally across the width of the web 11 being carried thereon and an outer row 25 of cooperating and alternating small and large electrodes 23 and 22 are disposed exterior to the peripheral surface 19 of the drum 20 laterally across the width of the web 11 in the arcuate arrangement illustrated so that each pair 21 of cooperating small and large electrodes 22 and 23 define a non-uniform electrostatic field 26 therebetween when the electrodes 22 and 23 of each pair are charged with opposite potentials or with a potential differential therebetween by one of the electrodes having a greater potential than the other electrode, such as by having the other electrode grounded or with a like but lesser charge thereon.

In any case, the electrodes in the outer row 25 have a different potential than the electrodes in the inner row 24 so that a plurality of alternating non-uniform electrostatic fields 26 are arranged in an arcuate path and extend through the material 11 as the same is moved by the rotating drum 20.

The operation of the method and apparatus 10 of this invention will now be described.

It is believed that as the wet web of material 11 moves in a clockwise direction from the guide roller 17 to the guide roller 18 on the outer periphery 19 of the drum 20, the action of the non-uniform electrostatic fields 26 causes the moisture particles 14 in the web of material 11 to be moved toward the higher intensity portions thereof which are disposed adjacent the smaller electrodes 23 for the reasons advanced in the aforementioned U.S. Pat. No. 3,966,575 whereby the moisture particles 14 in the web 11 on the side 15 of the center line or at the center line thereof are driven toward the side 15 and the moisture particles 14 at and on the side 16 of the center line thereof are driven toward the side 16 thereof by the theory of dielectrophoresis.

Further, it is believed that as a moisture particle 14 in the web 11 is being repetitively moved through an intense portion of a non-uniform electrostatic field 26 and then through an untense portion of the next adjacent field 26, a pulsating pumping action is being imposed on such moisture particle 14 as it is rapidly being moved through all of the non-uniform fields 26 because the intense portion of a field 26 pulls or pushes the particle 14 outwardly toward one side of the web 11 with a greater force than the force of an untense portion of a field 26. Thus, by providing a large number of alternately arranged non-uniform fields 26 and with the normal speed of a paper making machine, such as 3,000 to 5,000 feet per minute, it can be seen that each liquid particle 14 will be subjected to a rapid outward pumping action by the fields 26 as the particle 14 moves through the circular array of fields 26 from the inlet guide roller 17 to the outlet guide roller 18.

However, as set forth in the aforementioned article, the wet web of material 11 normally has the outer layers of material thereof formed substantially denser and harder than the inner layers of material thereof so that the moved moisture particles 14 would tend to be trapped in the outer denser layers. Thus, the force of the electrostatic fields 26 may not be sufficient to actually remove the moisture particles 14 from the wet web of material 11 but it is believed that the force will cause the same to move to and gather near the outer denser surfaces 15 and 16 thereof as set forth in the aforementioned article wherein the liquid particles are driven outwardly by exploding steam within the center of the wet web of material, the steam being caused by dielectric heating of the material in contrast to this invention which causes the moisture particles to be moved solely by an electrostatic non-uniform field action.

Thus, it is believed that when the wet web of material 11 leaves the drum 20, the same will have the moisture particles 14 arranged in the manner illustrated in FIG. 3 so that the same will be more readily evaporated when the same reaches the drying section 33 than if the drum 20 and non-uniform field arrangement 26 of this invention were not utilized whereby a "bonus effect" is produced by this invention to improve upon the conventional drying methods and apparatus.

Also, it is believed that since no actual current flow occurs between the electrodes 22 and 23 in each cooperating pair 21 thereof as each non-uniform field 26 is produced by a capacitance arrangement, this "bonus effect" of this invention is believed to be most efficient as the only work required is the movement of the web 11 through the fields 26 in much the same manner that a wire is moved in a permanent magnet field to create a current flow in the wire.

While the drum 20 of this invention is illustrated and described as being located between the sections 13 and 33, it is to be understood that the same could be located anywhere in the line, as desired. For example, the drum 20 could be located in the middle of the "can" drying section 33. Also, the outer peripheral part 19 of the drum 20 could be heated to assist the electrostatic field forces in moving the liquid particles 14 relative to the material 11. For example, steam could be injected into the drum 20 to heat its outer peripheral part 19, if desired, whereby such heated drum 20 could be considered one of the "cans" of the drying section 33.

In addition, it is believed that the liquid particles 14 can be water or any other suitable conductive or non-conductive liquid or combination of liquids, as desired. Also, the non-uniform fields 26 can be created by suitably interconnecting the electrodes 23 and/or 22 to a direct current source or alternating current source of any suitable voltage.

While an arcuate path of non-uniform fields 26 and a cylindrical carrier drum 20 therefor has been illustrated and described, it is to be understood that the nonuniform field path could be straight or any other desired configuration with the web 11 being carried on any suitable carrier or being passed through such non-uniform field path without a carrier, as described. Further, while only one drum 20 is illustrated, a plurality of drums 20 could be utilized with such drums 20 being in series or alternating with nonelectrostatic "cans" as desired.

Also, it is to be understood that while the rows 24 and 25 of electrodes 22 and 23 are illustrated in FIG. 1 as being spaced from the opposed sides of the web 11 a considerable distance, one or both of the rows 24 and 25 of electrodes 22 and 23 could be disposed closer or farther away from the web 11 than as illustrated, as desired. Further, the length of each electrode 22 or 23 could be shorter or longer than as illustrated. In fact, the smaller electrodes 23 could each be a fine wire disposed laterally to moving web 11. Thus, it can be seen that the non-uniform fields 26 could be uniform in the appearance thereof from inlet roller 17 to the outlet roller 18 or could be any arrangement of large, small etc. as they extend around the periphery of the drum 20 with some or all of the electrodes 22 and 23 being spaced from the web 11 different distances, as desired.

Thus, it can be seen that the rows 24 and 25 of electrodes 22 and 23, in effect, define a passage means having an inlet adjacent the guide roller 17 and an outlet adjacent the guide roller 18 so that the web 11 is passed through the inlet of such passage defining means to have the electrostatic action of the alternating non-uniform electrostatic fields act thereon whereby it is believed that by the time the web 11 reaches the outlet, at least some of the liquid particles 14 will be removed from the web 11 and/or at least some of the liquid particles 14 will be moved relative to the web as illustrated in FIG. 3 to provide a "bonus effect" which will improve upon the efficiency of the conventional drying section 33 in removing the liquid 14 from the material 11.

While the method and apparatus 10 has been previously described as operating with the inner row 24 of large and small electrodes 22 and 23 being stationary during the rotation of the drum 20, it is to be understood that the inner row 24 of electrodes 22 and 23 could rotate in unison with the drum 20 by forming part of the outer periphery 19 thereof or rotate independently of the movement of the drum 20 in either a clockwise or counterclockwise direction as desired by being carried on a drum separate from the drum 20.

In this manner, the electrostatic field pattern being created between the outer stationary row 25 of electrodes 22 and 23 and the moving inner row 24 of electrodes 22 and 23 would repetitively change from the non-uniform configurations 26 illustrated in FIG. 1 to the uniform field configurations 26' of FIG. 5 and then back to the non-uniform field arrangements 26 of FIG. 1 so that there would constantly be a non-uniform field arrangement 26 of FIG. 1 changing infinitely to the uniform field arrangement 26' of FIG. 5 and then changing infinitely back to the non-uniform field arrangement 26 of FIG. 1.

It might be found that the changing electrostatic field pattern between the non-uniform field arrangement 26 of FIG. 1 and the uniform field arrangement 26' of FIG. 5 has a greater effect for moving the moisture particles 14 toward the outer surfaces 15 and 16 of the web fibrous material 11 than just when the constant action of the non-uniform fields 26 is imposed thereon as previously described in connection with the operation of FIG. 1.

While the arrangement of FIG. 5 shows the electrostatic fields being formed uniform through the movement of the inner row 24 of electrodes 22 and 23 relative to the outer row 25 of electrodes 22 and 23, it is to be understood that the outer row 25 of electrodes 22 and 23 could be moved relative to the inner row 24, whether or not the inner row 24 is also movable or stationary as desired, whereby the resulting effect would still be a repetitively changing electrostatic field pattern between non-uniform fields and uniform fields for the reasons previously set forth.

While the method and apparatus 10 of this invention has been previously described as having all of the electrodes 22 and 23 in the inner row 24 provided with one like charge thereon and all of the electrodes 22 and 23 in the outer row 25 being provided with a like charge opposite to the charge on the inner row 24, it is to be understood that the non-uniform fields 26 could be provided by having all of the small electrodes 23 in both of the rows 24 and 25 of a like charge and all of the large electrodes 22 in the inner and outer rows 24 and 25 with a like and opposite charge as illustrated in FIG. 4. With such an arrangement, it might only perhaps be necessary to provide electrically insulating barriers 27 between adjacent electrodes 22 and 23 in each row 24 and 25 as illustrated in FIG. 4 to prevent adverse field action between adjacent electrodes 22 and 23 in the same row 24 or 25 thereof.

In this manner, all of the non-uniform fields 26 will have the intense portions thereof adjacent the smaller electrodes 23 of a like charge so that if the moisture particles 14 in the web of wet fibrous material 11 are more readily attracted toward the negative charges as illustrated in FIG. 4, then the movement of the moisture particles 14 toward the outer surfaces 15 and 16 of the web of material 11 would be greater by having the small electrodes 23 in both rows 24 and 25 provided with the desired negative charge thereon as illustrated rather than having the small electrodes 23 in either row 24 or 25 of FIG. 1 with positive charges thereon.

Of course, the arrangement of FIG. 4 could have the electrodes 22 and 23 being charged by alternating current rather than direct current so that all of the small electrodes 22 would first have a positive charge thereon and then have a negative charge thereon in a repetitive manner as provided by alternating current.

In fact, it may be found that when utilizing alternating current for any of the electrode arrangements of this invention, the same could be alternated with a high enough frequency that would place the same into a dielectric heating range for the dual benefit of attracting the particles 14 outwardly by electrostatic field forces as well as causing the particles 14 to be blown outwardly by the exploding steam created in the center section of the wet web of material 11 through the dielectric heating of the center moisture particles 14 thereof as fully disclosed in the aforementioned U.S. Pat. No. 3,966,575.

Also, it is to be understood that uniform electrostatic fields 26' of any desired length or combination of lengths could be disposed intermediate the non-uniform electrostatic fields 26 as illustrated in FIG. 6 to produce a desired pulling or pushing effect on the particles 14 in the web 11 as the same is passed therethrough in a manner similar to the embodiment of FIG. 5 as previously described.

While it is believed that the thickness of the material 11 could range anywhere between relatively thick ceiling tile sheets of fibrous material 11 down to paper thickness, it is to be understood that the web fibrous material 11 could be thicker than ceiling tile or thinner than paper, as desired.

Also, while the various electrostatic arrangements have been previously described as operating on wet tile like fibrous material, it is to be understood that the same could operate on other material, such as fluid, etc., as desired.

In addition, it may be found that it is desired to sonically or ultrasonically vibrate the fibrous web 11 during the same time that the web 11 is being acted upon by the non-uniform fields 26 whether the non-uniform fields 26 are static and constant or oscillating, such as by having the electrodes 22 and 23 interconnected to an alternating current source. In fact, it may be desired that the non-uniform fields 26 are oscillated by having the electrodes 22 and 23 interconnected to a high intensity, high frequency modulating electric source ot simultaneously dielectrically heat the liquid particles 14 in the web of material 11 at the same time the same is being sonically or ultrasonically vibrated for the reasons fully disclosed in the aforementioned U.S. Pat. Nos. 3,966,575 and 3,965,581. Also see U.S. Pat. No. 3,999,302.

In particular, the embodiment of the method and apparatus 10 of this invention as illustrated in FIG. 1 can include a plurality of sonic or ultrasonic fluid wave creating horns 34 to respectively create vibrations in the outer and opposed sides 15 and 16 of the web of material 11 as the web 11 passes through the non-uniform fields 26, such horns 34 at least being located where any dielectric heating action is taking place to change the moisture particles 14 to steam or being disposed completely along the web of material 11 as the same progresses from the inlet roller 17 to the outlet roller 18, as desired.

In any event, it is believed that the vibration of the outer opposed layers of the web of material 11 will reduce the friction of the fibers thereof to the outwardly moving moisture particles 14 whether the liquid particles 14 are being attracted outwardly by the non-uniform fields 26 in the manner previously described or being blown outwardly by the central moisture particles 14 turning to steam through the dielectric heating thereof should the non-uniform fields 26 be oscillated with a high frequency to cause such dielectric heating of the moisture particles 14 whereby the "bonus effect" is believed to be increased by the increase in the flowability of the moisture particles 14 outwardly through the outer layers of the strip of material 11.

In fact, it may be found that the sonic or ultrasonic vibration of the moisture particles 14 in the outer layers of the strip of material 11 as the same passes through the non-uniform fields 26 will cause a mechanical dielectric heating of the moisture particles 14 in at least the outer layers thereof because the outer layers of the strip of material 11 will be vibrated at a greater rate than the inner layers of the strip of material 11 since it is believed that the vibrating waves progressively dissipate as the same progressively penetrate inwardly into the material 11.

However, it is believed that the mechanical movement of the moisture particles 14 will cause the same to be in different positions relative to the lines of force of each particular non-uniform field 26 to cause a change in the alignment of the electrons of the moisture particle and thereby cause that moisture particle to partially rotate even if the particular field 26 acting thereon is static and constant rather than being oscillated. Of course, if the particular field 26 is oscillated, the partial rotation of each moisture particle 14 passing therethrough by the change of its position in the non-uniform field 26 by vibration augments the oscillating action of that moisture particle 14 through the oscillating field 26 itself.

For example, it can readily be seen from FIG. 2 that the electric field lines of force 28 of a particular non-uniform field 26 illustrated therein have been superimposed upon the strip of material 11, such field 26 being created between a small electrode 23 and a large electrode 22.

In this manner, a particle of liquid 14 being carried through the field 26 along the line 31 from a point 29 on the outer extreme field force line 28A of the field 26 to the point 30 on the other extreme field line 28B of the particular non-uniform field 26 will be vibrated upwardly and downwardly, such as along the line 32 illustrated in FIG. 2, so that the liquid particle 14 will have the angle of the field force lines 28 changed thereon as that particular particle 14 progresses through the non-uniform field 26.

Therefore, it is believed that a mechanical dielectric heating action will take place on the moisture particles 14 through the sonic or ultrasonic vibration thereof with the particles 14 in the outer layers thereof being dielectrically heated at a greater rate than the moisture particles 14 in the inner layer of the material 11 because of the believed to be dissipation of the vibrating waves as they progressively penetrate into the material 11.

Conversely, should the non-uniform fields 26 be oscillated with a high frequency, high intensity electric current, it is believed that the moisture particles 14 in the inner layer of the web 11 will be more readily heated and changed to steam by such oscillating electric fields 26 than the moisture particles 14 in the outer layers because the moisture particles 14 in the outer layers readily dissipate their heat to the surrounding atmosphere.

Thus, it may be found that there is a heat leveling factor created through the combination of the dielectric heating operation and the vibrating action so that all of the moisture particles 14 throughout the entire cross sectional thickness of the web 11 will be heated at least to the same degree and in fact, the moisture particles 14 in the outer layers may be even heated to a greater degree when adding the effect of the mechanical vibration thereof and the oscillating electric fields thereon.

Accordingly, it can be seen that it is believed that by vibrating the fibrous sheet 11 in the angled field force lines 28 of the non-uniform fields 26 during the operation of the apparatus 10, it will cause the moisture particles 14 to be mechanically moved back and forth across the angled field force lines 28 at a very rapid rate so that such change in the direction of the field force lines 28 on each moisture particle 14 will cause the same to be dielectrically heated mechanically and if the fields 26 themselves are also being oscillated with a high frequency electric current, an increase in the dielectric heating action of the moisture particles 14 might take place over the rate of dielectric therof if the vibration action did not take place and only the oscillating electric fields 26 were provided.

In this manner, it may be found that since a greater total dielectric heating action is produced through the combination of vibrations and the high frequency electric oscillating fields 26 on the moisture particles 14 in the outer layers of the web 11 than in the inner layer thereof, less total electric energy may be required to be utilized or the fields 26 may not be required to be oscillated with as high a frequency and/or intensity since not only are the moisture particles 14 being more readily dielectrically heated, but also the increased flowability of the moisture entrained particles out through the outer layers by the exploding steam in the manner previously described may also permit less use of total energy.

Also, it may be found that the same high frequency electric source for operating the electric fields 26 for producing the dielectric heating operation can also be the source for operating the vibratory means 34 whereby the total cost for both operations in this invention might be less than each being completely separate and then added together.

While the vibration producing horns 32 are illustrated in FIG. 1 to provide the vibrating action on the web 11, it is to be understood that direct engagement of the web 11 could take place. For example, the drum 20 could have its outer periphery 19 or selected parts thereof vibrated to impart vibration to the web 11 as desired.

Also, some or all of the electrodes that provide the dielectric heating action could directly engage the web 11 and such engaging electrodes, whether insulated or uninsulated, could be sonically or ultrasonically vibrated to provide the dual function of dielectrically heating and vibrating the web 11, such as in the manner disclosed and claimed in the aforementioned U.S. Pat. No. 3,999,302. Thus, if some or all of the electrodes for dielectric heating are also vibrated and the same source of high frequency electric energy is utilized to create the oscillating field action and the vibrating action, the resulting cost of combining such two actions could be reduced over the cost of providing the two actions with separate equipment. In fact, it may be found that only few engaging electrodes in the steam creating area of the traveling web need be vibrated to provide for the hoped for previously described advantageous results.

While this present disclosure has stressed the use of non-uniform fields of an alternating arrangement, it is to be understood that it is believed that conventional dielectric heating arrangements could be augmented or enhanced by using vibratory action in combination therewith for any of the reasons previously set forth.

Also, while the various embodiments of this invention as previously described have each been provided with an inner row of electrodes 24 either forming part of the rotatable drum or be separate therefrom while being disposed inside the outer periphery 19 thereof, it is believed that by merely providing an electrode arrangement adjacent a heated surface with that surface either being electrically conductive or provided with an electric insulating coating thereon while being electrically conductive beneath such coating, the outer electrode arrangement can cooperate with the heated surface to define a plurality of alternate arranged non-uniform electric fields extending between the electrode arrangement and the surface with each non-uniform field having the higher intensity portion thereof substantially oppositely located relative to the higher intensity portion of an adjacent non-uniform field so that the fields can at least partially extend through a material disposed against the surface and between the surface and the electrode arrangement.

For example, such a method and apparatus is illustrated in FIG. 7 wherein the drum 20 comprises a conventional paper-making drying drum of the "can" or "Yankee" configuration and having an outer heated peripheral surface 19 against which the material 11 rotates therewith to be dried thereby. However, an electrode arrangement of this invention comprising a plurality of large electrodes 22 and small electrodes 23 of the type previously described are arranged in a circular array adjacent the outer periphery 19 of the drum 20 to cooperate with the conductive portion of the drum 20, whether the conductive portion forms the outer periphery 19 thereof or is disposed beneath the outer periphery 19 if the outer periphery 19 is formed of electrically insulating material. It is believed that the charged electrodes 22 and 23 will still form the non-uniform fields 26 in the alternately arranged manner illustrated in FIG. 7 because the conductive portion of the drum 20 will be in a grounded condition thereof and cooperate with charged electrodes 22 and 23 through induction to form the non-uniform fields 26 as illustrated.

For example, it is believed that the small electrodes 23 create such an intense field arrangement that the same will draw from larger areas of the drum 20 than the areas attracted by the large electrodes 22.

Accordingly, it can be seen that already existing dryer drums can be modified by merely disposing a row of large and small electrodes 22 and 23 about the outer periphery thereof in the manner illustrated in FIG. 7 and charging those electrodes, either all with one charge or with the large electrodes 22 having one potential and the electrodes 23 having another potential (whereby insulators may need to be disposed between adjacent electrodes 22 and 23 in the manner provided by the insulators 27 of FIG. 4) and the grounded drum 20 will cooperate therewith to provide the non-uniform field 26 which will pass through the material 11 as the material 11 rotates with the drum 20. Of course, the drum 20 could be stationary and the material 11 can be merely moved over the drum 20, if desired.

In any event, it is believed that the non-uniform fields 26 disposed in the alternately arranged position illustrated in FIG. 7 will augment the drying effect of the drum 20 on the material 11 for all or at least some of the reasons previously set forth as the material 11 moves through the fields 26. Of course, the electrodes 22 and 23 could also be moving relative to or with the material 11 rather than be stationary as illustrated in FIG. 7.

Also, the electrodes 22 and 23 could be electrically insulated or uninsulated and the drum periphery could be electrically insulated or uninsulated as it is believed that the non-uniform fields 26 will still be created by charging the electrodes 22 and 23 even though the drum 20 is at ground potential and the periphery 19 thereof is insulated and the electrodes 22 and 23 are insulated. In addition, it may be found that it is desirable to have all or some of the electrodes 22 and 23 actually engage the material 11 during the drying thereof.

Further, it can be seen that the drum 20 could be vibrated and/or the material 11 could be vibrated by air horns or engagement means as described for the reasons previously set forth at the same time the fields 26 are acting on the material 11.

Accordingly, it can be seen that this invention provides improved methods and apparatus for drying material and the like.

While the forms and methods of this invention, now preferred, have been illustrated and described as required by the Patent Statute, it is to be understood that other forms and method steps can be utilized and still fall within the scope of the appended claims.

What is claimed is:

1. In a method for drying material by disposing said material against a heated surface means, the improvement comprising the steps of disposing charged electrode means adjacent said surface means to cooperate therewith to define a plurality of alternately arranged non-uniform electrostatic fields extending between said electrode means and said surface means with each non-uniform field having the higher intensity portion thereof substantially oppositely located relative to the higher intensity portion of an adjacent non-uniform field so that said fields at least partially extend through said material while said material is disposed against said surface means and between said surface means and said electrode means, *and causing relative movement between said electrode means and said material so that said non-uniform electrostatic fields serially act on at least a portion of said material while said portion of said material is being heated by said heated surface means.*

2. A method as set forth in claim 1 and including the step of forming said heated surface means to comprise a heated drum-like member.

3. A method as set forth in claim 1 and including the step of forming said electrode means to comprise a plurality of large and small electrodes with each said small electrode creating its non-uniform electrostatic field with said surface means so that the intense portion of that field is adjacent that small electrode and with each large electrode creating its non-uniform electrostatic field with said surface means so that the intense portion of that field is adjacent said surface means.

4. A method as set forth in claim 3 and including the step of causing all of said small electrodes to have the same polarity.

5. A method as set forth in claim 4 and including the step of causing all of said large electrodes to have the same polarity.

6. A method as set forth in claim 5 and including the step of causing said polarity of said small electrodes to be opposite to said polarity of said large electrodes.

7. A method as set forth in claim 5 and including the step of causing said polarity of said small electrodes to be the same as said polarity of said large electrodes.

8. A method as set forth in claim 1 and including the step of causing said heated surface means to be at ground potential.

9. A method as set forth in claim 1 and including the steps of forming said heated surface means to comprise a rotatable metallic dryer drum means having a generally cylindrical outer peripheral surface against which a web of said material engages and rotates therewith, forming said electrode means to comprise a plurality of large and small stationary electrodes respectively arranged in spaced parallel relation to said outer peripheral surface of said drum means and transverse to the direction of rotation of said drum means, arranging said large and small electrodes to be in spaced relation to each other and with a large electrode disposed between each pair of adjacent small electrodes, disposing said electrodes to extend across at least the width of said web of material and generally define an arcuate configuration that is generally concentric with said outer peripheral surface of said drum means, and causing rotation of said drum means so that said material moves in unison therewith to cause said relative movement between said electrode means and said material.

10. A method as set forth in claim 1 and including the steps of disposing said charged electrode means adjacent said surface means so that said plurality of alternately arranged non-uniform electrostatic fields comprise a plurality of spaced apart substantially constant and non-current consuming electrostatic fields extending between said electrode means and said surface means, and moving said material in one direction to provide said relative movement and to cause at least said portion of said material to have the particles of liquid thereof serially moved through an electrostatic field into a non field area and then into the next electrostatic field in a repetitive manner whereby said particles of liquid of said portion of said material are subjected to a pumping action by said spaced apart substantially constant and non-current consuming electrostatic fields while said portion of said material is being heated by said heated surface means.

11. In a method for drying material by disposing said material against a heated surface means of a dryer drum-like member to have said heated surface means heat at least part of the liquid particles of said material, the improvement comprising the steps of disposing charged electrode means adjacent said surface means to define a plurality of spaced apart substantially constant and non-current consuming electrostatic fields extending between said electrode means and said surface means so that said fields at least partially extend through said material while said material is disposed against said surface means and between said surface means and said electrode means, and moving said material in one direction to cause at least a portion of said material to have the particles of liquid thereof serially moved through an electrostatic field into a non field area and then into the next electrostatic field in a repetitive manner whereby said particles of liquid of said portion of said material are subjected to a pumping action by said spaced apart substantially constant and non-current consuming electrostatic fields while said portion of said material is being heated by said heated surface means.

12. A method as set forth in claim 11 and including the step of forming said electrode means to comprise a plurality of spaced apart electrodes with each electrode creating its electrostatic field with said surface means.

13. A method as set forth in claim 12 and including the step of charging all of said electrodes to have the same polarity.

14. A method as set forth in claim 13 and including the step of grounding said surface means.

15. A method as set forth in claim 12 and including the step of charging said electrodes so that adjacent electrodes have opposite polarity.

16. A method as set forth in claim 15 and including the step of grounding said surface means.

17. A method as set forth in claim 12 and including the steps of forming said heated surface means and said dryer drum-like member to comprise a rotatable metallic dryer drum means having a generally cylindrical outer peripheral surface against which a web of said material engages and rotates therewith, disposing said electrodes so as to be arranged in spaced parallel relation to said outer peripheral surface of said drum means and transverse to the direction of rotation of said drum means, and disposing said electrodes to extend across at least the width of said web of material and generally define an arcuate configuration that is generally concentric with said outer peripheral surface of said drum means.

18. In a method for drying material by disposing said material against a heated surface means to have said heated surface means heat at least part of the liquid particles of said material, the improvement comprising the steps of disposing charged electrode means adjacent said surface means to define a plurality of alternately directed and oppositely charged electrostatic fields that are substantially constant and non-current consuming and that extend between said electrode means and said surface means so that said fields at least partially extend through said material while said material is disposed against said surface means and between said surface means and said electrode means, and moving said material in one direction to cause at least a portion of said material to have the particles of liquid thereof serially moved through an electrostatic field with its negative charge adjacent said electrode means and then into the next electrostatic field with its positive charge adjacent said electrode means in a repetitive manner whereby said particles of liquid of said portion of said material are subjected to an alternately directed pumping action by said electrostatic fields while said portion of said material is being heated by said heated surface means.

19. A method as set forth in claim 18 and including the step of forming said electrode means to comprise a plurality of spaced apart electrodes with each electrode creating its electrostatic field with said surface means.

20. A method as set forth in claim 19 and including the step of forming said electrodes to respectively form non-uniform electrostatic fields with said surface means.

21. A method as set forth in claim 20 and including the step of grounding said surface means.

22. A method as set forth in claim 19 and including the step of charging said electrodes so that adjacent electrodes have opposite polarity.

23. A method as set forth in claim 22 and including the step of grounding said surface means.

24. A method as set forth in claim 19 and including the steps of forming said heated surface means to comprise a rotatable metallic dryer drum means having a generally cylindrical outer peripheral surface against which a web of said material engages and rotates therewith, disposing said electrodes so as to be arranged in spaced parallel relation to said outer peripheral surface of said drum means and transverse to the direction of rotation of said drum means, and disposing said electrodes to extend across at least the width of said web of material and generally define an arcuate configuration that is generally concentric with said outer peripheral surface of said drum means.

25. A method as set forth in claim 2 wherein said drum-like member comprises a dryer drum of a paper making machine or the like and said material comprises a strip of paper or the like being made by said machine.

26. A method as set forth in claim 11 wherein said heated surface means and said drum-like member comprise a dryer drum of a paper making machine or the like and said material comprises a strip of paper or the like being made by said machine.

27. A method as set forth in claim 18 wherein said heated surface means comprises a dryer drum of a paper making machine or the like and said material comprises a strip of paper or the like being made by said machine.

* * * * *